United States Patent [19]
Gilg

[11] Patent Number: 6,060,545
[45] Date of Patent: May 9, 2000

[54] STABILIZER MIXTURE FOR ORGANIC MATERIALS

[75] Inventor: Bernard Gilg, St. Louis-la-Chaussée, France

[73] Assignee: Ciba Specialty Chemicals Corporation, Tarrytown, N.Y.

[21] Appl. No.: 09/159,349

[22] Filed: Sep. 23, 1998

[30] Foreign Application Priority Data

Sep. 29, 1997 [CH] Switzerland ............ 2275/97

[51] Int. Cl.$^7$ .............. C08K 5/16; C08K 5/09; C09K 15/16
[52] U.S. Cl. ............ 524/199; 524/285; 524/289; 524/291; 524/333; 524/342; 524/343; 252/401; 252/402; 252/406; 252/407
[58] Field of Search ............ 524/199, 285, 524/289, 291, 333, 342, 343; 252/401, 402, 406, 407

[56] References Cited

U.S. PATENT DOCUMENTS

| | | | |
|---|---|---|---|
| 4,365,032 | 12/1982 | Yosizato et al. | 524/99 |
| 4,366,280 | 12/1982 | Yukawa | 524/291 |
| 4,562,281 | 12/1985 | Takahashi et al. | 560/104 |
| 4,774,274 | 9/1988 | Takata et al. | 524/291 |
| 4,956,408 | 9/1990 | Mathis et al. | 524/147 |
| 5,227,418 | 7/1993 | Mueller, Jr. et al. | 524/120 |
| 5,574,082 | 11/1996 | Keller et al. | 524/110 |
| 5,602,196 | 2/1997 | Gilg et al. | 524/171 |
| 5,616,780 | 4/1997 | Pitteloud et al. | 560/118 |
| 5,643,985 | 7/1997 | Hoffmann et al. | 524/291 |

FOREIGN PATENT DOCUMENTS

| | | |
|---|---|---|
| 0079806 | 5/1983 | European Pat. Off. . |
| 0346823 | 12/1989 | European Pat. Off. . |
| 0500323 | 8/1992 | European Pat. Off. . |
| 3914945 | 12/1989 | Germany . |
| 4443361 | 6/1996 | Germany . |

OTHER PUBLICATIONS

Derwent Abstr. 90–008550/02 for DE 3914945.
The Merck Index, 11$^{th}$ Edition, (1989), Ref. 1711, p. 257.
The Merck Index, 11$^{th}$ Edition, (1989), Ref. 1683, p. 254.
Derwent Abstract 96–287134/29 and Chem. Abstr. 125:116290 for DE 4443361.

*Primary Examiner*—Kriellion Sanders
*Attorney, Agent, or Firm*—Luther A.R. Hall; Tyler A. Stevenson

[57] ABSTRACT

Organic materials having excellent stability against oxidative, thermal or light-induced degradation comprise as stabilisers (i) at least one compound of formula I

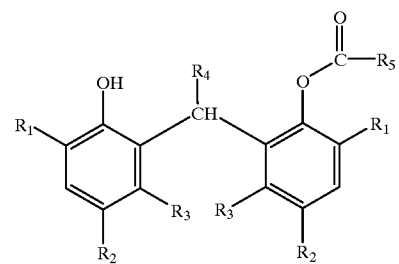

wherein the general symbols are as defined in claim 1, and (ii) calcium lactate and/or calcium stearoyl-2-lactylate.

18 Claims, No Drawings

STABILIZER MIXTURE FOR ORGANIC MATERIALS

The present invention relates to compositions that comprise an organic material subject to oxidative, thermal or light-induced degradation and, as stabiliser, at least one bisphenol ester derivative and calcium lactate and/or calcium stearoyl-2-lactylate, and to the use of the stabiliser mixture in stabilising organic materials against oxidative, thermal and/or light-induced degradation.

The use of bisphenol ester derivatives as stabilisers for organic polymers is known, for example, from U.S. Pat. No. 4,365,032; EP-A-0 079 806; U.S. Pat. No. 4,562,281; U.S. Pat. No. 4,774,274; EP-A-0 500 323; U.S. Pat. No. 5,602,196; EP-A-0 716 076; U.S. Pat. No. 5,616,780 and EP-A-0 727 410.

The use of, for example, calcium stearoyl-2-lactylate as a stabiliser for certain polymers is known, for example, from U.S. Pat. No. 4,366,280.

The known stabilisers do not in every respect meet the high demands made of a stabiliser, especially as regards storage stability, water absorption, sensitivity to hydrolysis, stabilisation during processing, colour behaviour, volatility, migration behaviour, compatibility and enhanced light stabilisation. There is therefore still a need for effective stabilisers for organic materials that are sensitive to oxidative, thermal and/or light-induced degradation.

It has now been found that a stabiliser mixture comprising at least one bisphenol ester derivative and calcium lactate and/or calcium stearoyl-2-lactylate is especially suitable as a stabiliser for organic materials that are sensitive to oxidative, thermal and/or light-induced degradation.

The present invention accordingly relates to compositions comprising a) an organic material subject to oxidative, thermal or light-induced degradation, b) at least one compound of formula I

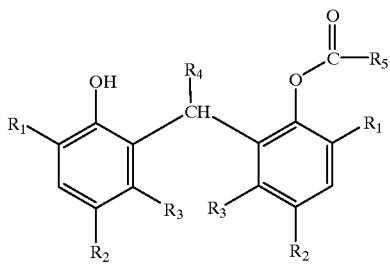

wherein $R_1$ and $R_2$ are each independently of the other $C_1$–$C_{25}$alkyl; $C_5$–$C_{12}$cycloalkyl unsubstituted or substituted by $C_1$–$C_4$alkyl; $C_7$–$C_9$phenylalkyl; or phenyl unsubstituted or substituted by $C_1$–$C_4$alkyl, $R_3$ is hydrogen or methyl, $R_4$ is hydrogen or $C_1$–$C_8$alkyl, $R_5$ is $C_1$–$C_{25}$alkyl; $C_2$–$C_{25}$alkyl interrupted by oxygen, sulfur or

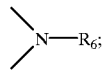

$C_2$–$C_{24}$alkenyl; $C_8$–$C_{30}$phenylalkenyl unsubstituted or substituted on the phenyl ring by halogen, $C_1$–$C_4$alkyl, $C_1$–$C_4$alkoxy or $C_1$–$C_4$alkylthio; $C_5$–$C_{12}$cycloalkyl unsubstituted or substituted by $C_1$–$C_4$alkyl; $C_8$–$C_{30}$phenylalkyl unsubstituted or substituted on the phenyl ring by halogen, $C_1$–$C_4$alkyl, $C_1$–$C_4$alkoxy or $C_1$–$C_4$alkylthio; or phenyl unsubstituted or substituted by halogen, $C_1$–$C_4$alkyl, $C_1$–$C_4$alkoxy or $C_1$–$C_4$alkylthio, and $R_6$ is hydrogen or $C_1$–$C_{18}$alkyl, and c) calcium lactate and/or calcium stearoyl-2-lactylate.

Alkyl having up to and including 25 carbon atoms is a branched or unbranched radical, for example methyl, ethyl, propyl, isopropyl, n-butyl, sec-butyl, isobutyl, tert-butyl, 1,1-dimethyl-1-propyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred meanings of $R_1$ and $R_2$ is, for example, $C_1$–$C_{18}$alkyl, especially $C_1$–$C_{12}$alkyl, e.g. $C_1$–$C_8$alkyl. An especially preferred meaning of $R_1$ and $R_2$ is, for example, $C_1$–$C_6$alkyl, especially $C_1$–$C_5$alkyl, e.g. tert-butyl or 1,1-dimethyl-1-propyl, that is to say, tert-pentyl. A preferred meaning of $R_5$ is, for example, $C_1$–$C_{18}$alkyl, especially $C_1$–$C_{12}$alkyl. A preferred meaning of $R_6$ is, for example, $C_1$–$C_{12}$alkyl, especially $C_1$–$C_8$alkyl, e.g. $C_1$–$C_4$alkyl.

$C_5$–$C_{12}$Cycloalkyl unsubstituted or substituted by $C_1$–$C_4$alkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl, cyclooctyl, cyclononyl, cyclodecyl, cycloundecyl or cyclododecyl. A preferred meaning of $R_1$ and $R_2$ is, for example, $C_5$–$C_8$cycloalkyl unsubstituted or substituted by methyl, especially cyclohexyl unsubstituted or substituted by methyl, e.g. cyclohexyl or α-methylcyclohexyl. A preferred meaning of $R_5$ is, for example, $C_5$–$C_8$cycloalkyl, especially $C_5$–$C_6$cycloalkyl, e.g. cyclohexyl.

$C_7$–$C_9$Phenylalkyl is, for example, benzyl, α-methylbenzyl, α,α-dimethylbenzyl or 2-phenylethyl. Benzyl and α-dimethylbenzyl are preferred.

Phenyl that is substituted by halogen, $C_1$–$C_4$alkyl, $C_1$–$C_4$alkoxy or $C_1$–$C_4$alkylthio and contains preferably from 1 to 3, especially 1 or 2, alkyl groups is, for example, o-, m- or p-methylphenyl, o-, m- or p-methoxyphenyl, o-, m- or p-chlorophenyl, o-, m- or p-methylthiophenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_2$–$C_{25}$Alkyl interrupted by oxygen, sulfur or >N—$R_6$ is, for example, $CH_3$—O—$CH_2$—, $CH_3$—O—$CH_2CH_2$—, $CH_3$—S—$CH_2$—, $CH_3$—NH—$CH_2$—, $CH_3$—N($CH_3$)—$CH_2$—, $CH_3$—O—$CH_2CH_2$—O—$CH_2$—, $CH_3CH_2$—O—$CH_2CH_2$—O—$CH_2CH_2$—, $CH_3$—(O—$CH_2CH_2$—)$_2$O—$CH_2CH_2$—, $CH_3$—(O—$CH_2CH_2$—)$_3$O—$CH_2CH_2$— or $CH_3$—(O—$CH_2CH_2$—)$_4$O—$CH_2CH_2$—.

Alkenyl having from 2 to 24 carbon atoms is a branched or unbranched radical, for example vinyl, propenyl, 2-butenyl, 3-butenyl, isobutenyl, n-2,4-pentadienyl, 3-methyl-2-butenyl, n-2-octenyl, n-2-dodecenyl, isododecenyl, oleyl, n-2-octadecenyl or n-4-octadecenyl. Alkenyl having from 2 to 18, especially from 2 to 10, carbon atoms, e.g. vinyl, is preferred.

$C_8$–$C_{30}$Phenylalkenyl unsubstituted or substituted on the phenyl ring by halogen, $C_1$–$C_4$alkyl, $C_1$–$C_4$alkoxy or $C_1$–$C_4$alkylthio is a branched or unbranched radical, for example styryl, 2-(p-methoxyphenyl)-1-ethenyl, 2-(p-chlorophenyl)-1-ethenyl, 2-(p-methylphenyl)-1-ethenyl, 2-(p-methylthiophenyl)-1-ethenyl, 2-phenyl-2-methyl-1-ethenyl, 3-phenyl-1-propenyl, 4-phenyl-1-butenyl, 5-phenyl-1-pentenyl, 6-phenyl-1-hexenyl, 7-phenyl-1-heptenyl or 8-phenyl-1-octenyl.

$C_8$–$C_{30}$Phenylalkyl unsubstituted or substituted on the phenyl ring by halogen, $C_1$–$C_4$alkyl, $C_1$–$C_4$alkoxy or $C_1$–$C_4$alkylthio is a branched or unbranched radical, for example phenylethyl, 2-(p-methoxyphenyl)-ethyl, 2-(p-chlorophenyl)-ethyl, 2-(p-methylphenyl)-ethyl, 2-(p-methyl-thiophenyl)-ethyl, 2-phenyl-2-methyl-ethyl, 3-phenylpropyl, 4-phenylbutyl, 5-phenylpentyl, 6-phenylhexyl, 7-phenylheptyl or 8-phenytoctyl.

Halogen is, for example, chlorine, bromine or iodine. Chlorine is preferred.

Preference is given to compositions comprising as component (b) at least one compound of formula I wherein $R_1$ and $R_2$ are each independently of the other $C_1$–$C_{18}$alkyl; $C_5$–$C_8$cycloalkyl unsubstituted or substituted by $C_1$–$C_4$alkyl; $C_7$–$C_9$phenylalkyl; or phenyl, $R_3$ is hydrogen or methyl, $R_4$ is hydrogen or $C_1$–$C_8$alkyl, $R_5$ is $C_1$–$C_{18}$alkyl; $C_2$–$C_{18}$alkyl interrupted by oxygen, sulfur or >N—$R_6$; $C_2$–$C_{18}$alkenyl; $C_8$–$C_{18}$phenylalkenyl unsubstituted or substituted on the phenyl ring by halogen, $C_1$–$C_4$alkyl, $C_1$–$C_4$alkoxy or $C_1$–$C_4$alkylthio; $C_5$–$C_{12}$cycloalkyl; $C_8$–$C_{18}$phenylalkyl unsubstituted or substituted on the phenyl ring by halogen, $C_1$–$C_4$alkyl, $C_1$–$C_4$alkoxy or $C_1$–$C_4$alkylthio; or phenyl unsubstituted or substituted by chlorine, $C_1$–$C_4$alkyl or $C_1$–$C_4$alkoxy, and $R_6$ is hydrogen or $C_1$–$C_{12}$alkyl.

Preference is given also to compositions comprising as component (b) at least one compound of formula I wherein $R_1$ and $R_2$ are each independently of the other $C_1$–$C_{12}$alkyl, $C_5$–$C_8$cycloalkyl, $C_7$–$C_9$phenylalkyl or phenyl, $R_3$ is hydrogen, $R_4$ is hydrogen or $C_1$–$C_4$alkyl, and $R_5$ is $C_1$–$C_{12}$alkyl; $C_2$–$C_{12}$alkyl interrupted by oxygen or sulfur; $C_2$–$C_{12}$alkenyl; $C_8$–$C_{10}$phenylalkenyl unsubstituted or substituted on the phenyl ring by $C_1$–$C_4$alkyl or $C_1$–$C_4$alkoxy; $C_5$–$C_8$-cycloalkyl; $C_8$–$C_{18}$phenylalkyl unsubstituted or substituted on the phenyl ring by chlorine, $C_1$–$C_4$alkyl or $C_1$–$C_4$alkoxy; or phenyl unsubstituted or substituted by chlorine, $C_1$–$C_4$alkyl or $C_1$–$C_4$alkoxy.

Preference is likewise given to compositions comprising as component (b) at least one compound of formula I wherein $R_1$ is $C_1$–$C_6$alkyl, cyclohexyl or phenyl, $R_2$ is $C_1$–$C_6$alkyl, cyclohexyl or phenyl, $R_3$ is hydrogen, $R_4$ is hydrogen or methyl, and $R_5$ is $C_1$–$C_{12}$alkyl; $C_2$–$C_{12}$alkyl interrupted by oxygen; $C_2$–$C_{10}$alkenyl; $C_8$–$C_{10}$phenylalkenyl unsubstituted or substituted on the phenyl ring by methoxy; cyclohexyl; or phenyl unsubstituted or substituted by chlorine or methoxy.

Of special interest are compositions comprising as component (b) at least one compound of formula I wherein $R_1$ is tert-butyl or tert-pentyl, $R_2$ is $C_1$–$C_5$alkyl, $R_3$ is hydrogen, $R_4$ is hydrogen or methyl, and $R_5$ is vinyl.

Also of special interest are compositions comprising as component (b) at least one compound of formula I according to Table 1.

TABLE 1

Compounds of formula I

| No. | $R_1$ | $R_2$ | $R_3$ | $R_4$ | $R_5$ |
|---|---|---|---|---|---|
| 101 | tert-butyl | methyl | H | H | $CH_2$=CH— |
| 102 | tert-pentyl | tert-pentyl | H | methyl | $CH_2$=CH— |
| 103 | tert-butyl | tert-butyl | H | methyl | $CH_2$=CH— |
| 104 | tert-butyl | methyl | H | methyl | $CH_2$=CH— |
| 105 | tert-butyl | tert-butyl | H | methyl | methyl |
| 106 | tert-butyl | tert-butyl | H | methyl | ethyl |
| 107 | tert-butyl | tert-butyl | H | methyl | n-propyl |
| 108 | tert-butyl | tert-butyl | H | methyl | n-butyl |
| 109 | tert-butyl | tert-butyl | H | methyl | n-pentyl |
| 110 | tert-butyl | tert-butyl | H | methyl | n-hexyl |
| 111 | tert-butyl | tert-butyl | H | methyl | n-heptyl |
| 112 | tert-butyl | tert-butyl | H | methyl | n-octyl |
| 113 | tert-butyl | tert-butyl | H | methyl | n-nonyl |
| 114 | tert-butyl | tert-butyl | H | methyl | n-decyl |
| 115 | tert-butyl | tert-butyl | H | methyl | n-undecyl |
| 116 | tert-butyl | tert-butyl | H | methyl | $CH_3(CH_2)_3CH(CH_2CH_3)$— |
| 117 | tert-butyl | tert-butyl | H | methyl | $CH_3CH$=CH— |
| 118 | tert-butyl | tert-butyl | H | methyl | $CH_2$=CH$(CH_2)_8$— |
| 119 | tert-butyl | tert-butyl | H | methyl | phenyl-CH=CH— |
| 120 | tert-butyl | tert-butyl | H | methyl | p-methoxyphenyl-CH=CH— |
| 121 | tert-butyl | tert-butyl | H | methyl | o-chlorophenyl- |
| 122 | tert-butyl | tert-butyl | H | methyl | p-methoxyphenyl- |

Of particular interest are compositions comprising as component (b) compound (101) or (102).

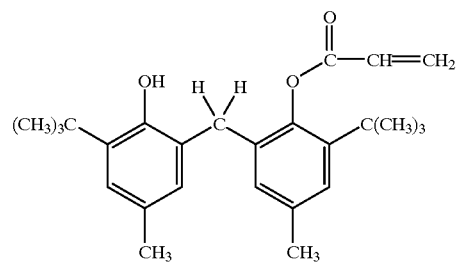

(101)

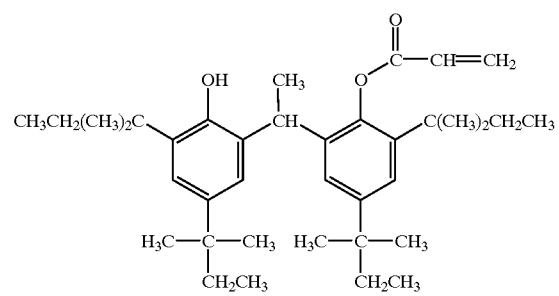

(102)

Some of the compounds of formula I are known from the literature or can be prepared analogously to the processes disclosed in the following literature sources: U.S. Pat. No. 4,365,032; EP-A-0 079 806; U.S. Pat. No. 4,562,281; U.S. Pat. No. 4,774,274; EP-A-0 500 323; U.S. Pat. No. 5,602, 196; EP-A-0 716 076; U.S. Pat. No. 5,616,780 and EP-A-0 727 410.

Compound (101) is available commercially under the name Irganox®3052 (Ciba Spezialitätenchemie AG) or Sumilizer®GM (Sumitomo); compound (102) is available commercially under the name Sumilizer®GS (Sumitomo).

The terms calcium lactate and calcium stearoyl-2-lactylate are to be understood as meaning those compounds as disclosed in U.S. Pat. No. 4,366,280. A further description of calcium lactate may be found, for example, in The Merck Index, Eleventh Edition, 1683, page 254 (1989). A useful description of calcium stearoyl-2-lactylate may be found, for example, in The Merck Index, Eleventh Edition, 1711, page 257 (1989). These known commercially available compounds are, for example, used also as additives in foodstuffs. They are available from the American Ingredients Company, PATCO Polymer Additives Division, Kansas City, USA, under the following tradenames: Pationic®1230 (calcium lactate); Pationic®1240 (mixture of calcium lactate and calcium hydroxide); Pationic®930 (calcium stearoyl-2-lactylate); Pationic®940 (mixture of calcium stearoyl-2-lactylat and calcium hydroxide); Pationic®1250 (mixture of calcium lactate, calcium stearoyl-2-lactylate and calcium hydroxide).

Of special interest are compositions wherein component (c) is calcium stearoyl-2-lactylate.

Also of interest are compositions that comprise, in addition to components (a), (b) and (c), also (d) at least one compound from the group of the phenolic antioxidants.

Of particular interest are compositions comprising as component (d) at least one compound from the group of the phenolic antioxidants approved for food use.

Likewise of interest are compositions wherein component (d) is a compound of formula AO-1, AO-2, AO-3, AO-4, AO-5, AO-6, AO-7, AO-8 or AO-9

(AO-1), Irganox®1076

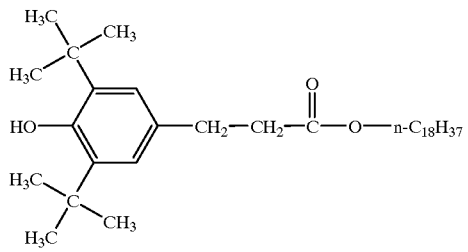

(AO-2), Irganox®1010

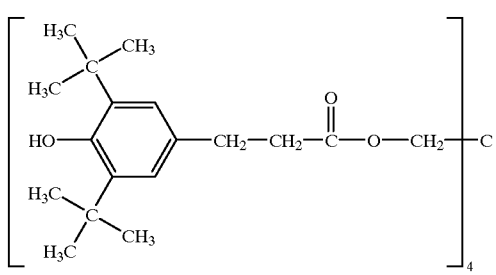

(AO-3), Tropanol®CA

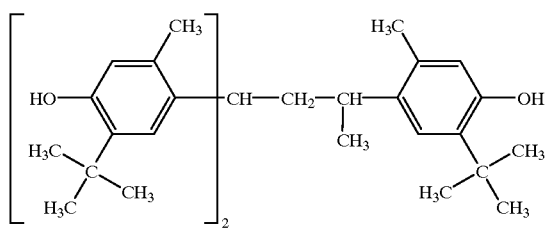

(AO-4), Hostanox®03

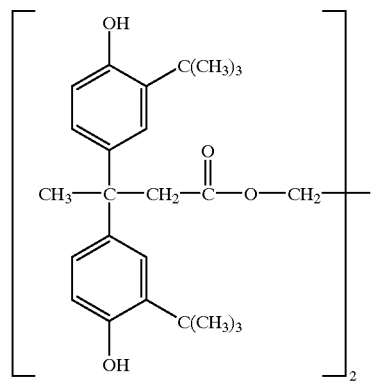

(AO-5), Irganox®415

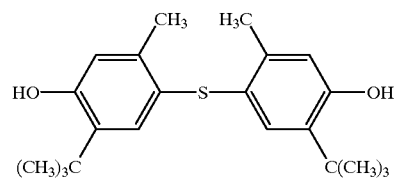

(AO-6), Cyanox®425

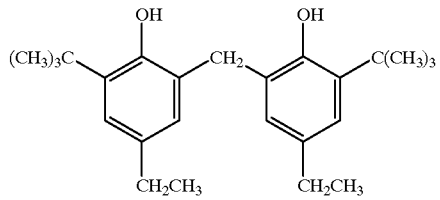

(AO-7), Irganox®2246

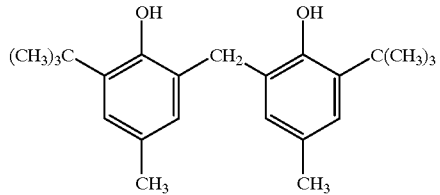

(AO-8), Vulkanox®ZKF

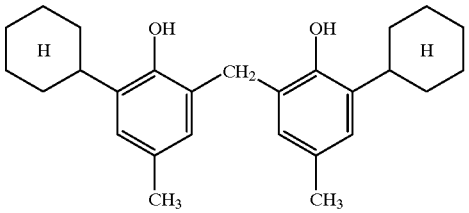

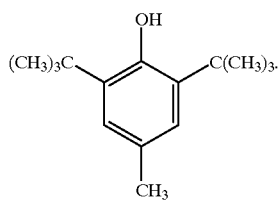
(AO-9), BHT

Component (d) of the composition according to the invention, that is to say, the compounds from the group of the phenolic antioxidants, are known and some of them are available commercially.

Irganox®1076, Irganox®1010, Irganox®415 and Irganox®2245 are protected tradenames of Ciba Spezialität ätenchemie AG. Topanol®CA (ICI), Hostanox®03 (Hoechst), Cyanox®425 (American Cyanamid), Vulkanox®ZKF (Bayer) and BHT (Uniroyal) are also available commercially.

The mixture of components (b) and (c), or (b), (c) and (d), is suitable for the stabilisation of organic materials against oxidative, thermal or light-induced degradation.

Examples of such materials are as follows:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/AA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrytate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

The mixture of components (b) and (c), or (b), (c) and (d), is used also in the preparation of polyurethane, especially in the preparation of polyurethane flexible foams. In that process, the compositions according to the invention and the products made from them are effectively protected against degradation. Scorching, especially, is avoided during the preparation of the foam.

The polyurethanes are obtained, for example, by reacting polyethers, polyesters and polybutadienes which contain terminal hydroxy groups with aliphatic or aromatic polyisocyanates.

Polyethers having terminal hydroxy groups are known and are prepared, for example, by the polymerisation of epoxides, such as ethylene oxide, propylene oxide, butylene oxide, tetrahydrofuran, styrene oxide or epichlorohydrin, with themselves, e.g. in the presence of $BF_3$, or by the addition of those epoxides, as appropriate in admixture or one after another, to starting components that contain reactive hydrogen atoms, such as water, alcohols, ammonia or amines, e.g. ethylene glycol, 1,3-propylene glycol, 1,2-propylene glycol, trimethylolpropane, 4,4'-dihydroxydiphenylpropane, aniline, ethanolamine or ethylenediamine. Also suitable according to the invention are sucrose polyethers. In many cases, polyethers that have predominantly primary OH groups (up to 90% by weight, based on all the OH groups present in the polyether) are preferred. Also suitable are polyethers that have been modified by vinyl polymers (as obtained, for example, by polymerisation of styrene and acrylonitrile in the presence of polyethers) and polybutadienes that contain OH groups.

Those compounds generally have molecular weights of from 400 to 10 000. They are polyhydroxyl compounds, especially compounds that contain from two to eight hydroxy groups, more especially those having a molecular weight of from 800 to 10 000, preferably from 1 000 to 6 000, for example polyethers that contain at least 2, generally from 2 to 8, but preferably from 2 to 4, hydroxyl groups, such as are known per se in the preparation of homogeneous polyurethanes and cellular polyurethanes.

It will be understood that mixtures of the above-mentioned compounds containing at least two hydrogen atoms that are reactive towards isocyanates, especially such compounds having a molecular weight of from 400 to 10 000, may be used.

Suitable polyisocyanates include aliphatic, cycloaliphatic, araliphatic, aromatic and heterocyclic polyisocyanates, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any desired mixtures of those isomers, 1-isocyanato-3,3,5-trimethyl-5-isocyanatomethylcyclohexane, 2,4- and 2,6-hexahydrotolylidene diisocyanate and any desired mixtures of those isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylidene diisocyanate and any desired mixtures of those isomers, diphenylmethane-2,4'- and/or -4,4'-diisocyanate, naphthylene-1,5-diisocyanate, triphenylmethane-4,4',4"-triisocyanate, polyphenyl-polymethylene-polyisocyanates, as obtained by aniline/formaldehyde condensation and subsequent phosgenation, m- and p-isocyanatophenylsulfonyl isocyanates, perchlorinated arylpolyisocyanates, polyisocyanates containing carbodiimide groups, polyisocyanates containing allophanate groups, polyisocyanates containing isocyanurate groups, polyisocyanates containing urethane groups, polyisocyanates containing acylated urea groups, polyisocyanates containing biuret groups, polyisocyanates containing ester groups, reaction products of the above-mentioned isocyanates with acetals, and polyisocyanates containing polymeric fatty acid radicals.

It is also possible to use the isocyanate-group-containing distillation residues obtained in the industrial preparation of isocyanates, those residues optionally being dissolved in one or more of the above-mentioned polyisocyanates. Furthermore, any desired mixtures of the above-mentioned polyisocyanates may be used.

Special preference is generally given to polyisocyanates that are technically easy to obtain, e.g. 2,4- and 2,6-tolylidene diisocyanate and any desired mixtures of those isomers ("TDI"), polyphenyl-polymethylene-polyisocyanates, as prepared by aniline/formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates").

The organic materials to be protected are especially natural, semi-synthetic or, more especially, synthetic polymers. Preference is given especially to thermoplastic polymers, especially copolymers of styrene or α-methylstyrene with dienes, more especially styrene/butadiene copolymers, styrene/butadiene block copolymers and polybutadienes.

Especially preferred styrene/butadiene block copolymers are Styrolux® (BASF) and K-Resin® (Phillips Petroleum Company). The preparation of those plastics is described, for example, in DE-A-3 914 945; EP-A-0 346 823 and U.S. Pat. No. 4,956,408.

Special attention is drawn to the action of the compounds according to the invention against thermal and oxidative degradation, especially in the event of thermal stress such as occurs in the processing of thermoplastics. Components (b) and (c), or (b) (c) and (d), according to the invention are therefore excellent for use as processing stabilisers.

Components (b), (c) and (d) are added to the organic material to be stabilised advantageously in an amount of from 0.01 to 5%, for example from 0.01 to 2%, preferably from 0.025 to 2%, based on the weight of the organic material to be stabilised.

In addition to components (a), (b), (c) and (d), the compositions according to the invention may comprise further co-stabilisers (additives), such as, for example, the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4- hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3, 5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3, 3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3, 5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3.5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3- dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl- 2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxy-carbonylethyl)phenyl) benzotriazole, hydroxyphenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$-]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane-tetracarboxylate, 1,1'-(1,2-ethanediyl)-bis(3,3, 5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2, 4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4, 6-trichloro-1,3,5-triazine as well as 4-butylamino-2,2,6,6-tetramethylpiperidine (CAS Reg. No. [136504-96-6]); N-(2, 2,6,6-tetramethyl-4-piperidyl)-n-dodecylsuccinimid, N-(1, 2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene N,N'-bis-formyl-N,N'-bis(2,2,6,6-tetramethyl-4-piperidyl) hexamethylenediamine, diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxydisubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis (2,4-dimethylphenyl)-113,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1 ,3,2-dioxaphosphocin, 6-fluoro-2,4,8, 10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3', 5,5'-tetra-tert-butyl-1,1'-biphenyl-2,2'-diyl)phosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbanate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3, 5-dimethylphenyl)-5,7-di-tert-butyl-benzofuran-2-one, 3-(3, 5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di-methylphenyl)-5,7-di-tert-butyl-benzofuran-2-one.

With the exception of the benzofuranones listed under point 14, the co-stabilisers are added in concentrations of, for example, from 0.01 to 10%, based on the total weight of the organic material to be stabilised.

The amount of benzofuran-2-ones additionally used may vary within wide limits. For example the benzofuran-2-ones may be present in the compositions according to the invention in amounts of from 0.0001 to 5% by weight, preferably from 0.001 to 2% by weight, especially from 0.01 to 2% by weight.

The fillers and reinforcing agents (point 12 of the list) such as, for example, talc, calcium carbonate, mica or kaolin, are added to the polyolefin in concentrations of, for example, from 0.01 to 40% based on the total weight of the polyolefin to be stabilised.

The fillers and reinforcing agents (point 12 of the list) such as, for example, metal hydroxides, especially aluminium hydroxide or magnesium hydroxide, are added to the polyolefin in concentrations of, for example, from 0.01 to 60% based on the total weight of the polyolefin to be stabilised.

Carbon black, as filler, is added to the polyolefin advantageously in concentrations of from 0.01 to 5% based on the total weight of the polyolefin to be stabilised.

Glass fibres, as reinforcing agents, are added to the polyolefin advantageously in concentrations of from 0.01 to 20% based on the total weight of the polyolefin to be stabilised.

Further preferred compositions comprise, in addition to components (a), (b) and (c), or (a), (b), (c) and (d), also further additives, especially alkaline earth metal salts of higher fatty acids, for example calcium stearate.

Components (b) and (c), or (b), (c) and (d), and also where applicable further additives, are incorporated into the polymeric organic material according to known methods, for example before or during the shaping, or alternatively by applying a solution or dispersion of the stabiliser mixture to the organic polymeric material, if necessary with subsequent evaporation of the solvent. The stabiliser mixture of components (b) and (c), or (b), (c) and (d), and where applicable further additives, may also be added to the materials to be stabilised in the form of a master batch that contains the mixture in a concentration of, for example, from 2.5 to 25% by weight.

The stabiliser mixture of components (b) and (c), or (b), (c) and (d), and where applicable further additives, may also be added before or during polymerisation or before crosslinking.

The stabiliser mixture of components (b) and (c), or (b), (c) and (d), and where applicable further additives, may be incorporated into the organic material to be stabilised as it is or encapsulated in waxes, oils or polymers.

The stabiliser mixture of components (b) and (c), or (b), (c) and (d), and where applicable further additives, may also be applied to the polymer to be stabilised by spraying. The mixture can be used to dilute other additives (e.g. the above-mentioned conventional additives) or melts thereof, so that it is also possible for the mixture to be sprayed together with those additives onto the polymer to be stabilised. Addition by spraying during the deactivation of the polymerisation catalysts is especially advantageous, it being possible, for example, for the vapour used for the deactivation to be utilised for the spraying.

For example, where the polymers are polymerised in the form of beads, it may be advantageous for the stabiliser mixture of components (b) and (c), or (b), (c) and (d), and where applicable other additives, to be applied by spraying.

The materials stabilised in that manner may be used in an extremely wide variety of forms, e.g. in the form of films, fibres, ribbons, moulding compounds or profiles, or as binders for surface-coatings, especially powder coatings, adhesives or cement.

As has already been mentioned, the organic materials to be protected are preferably organic, especially synthetic, polymers. Especially advantageously thermoplastic materials are protected, particular attention being drawn to the excellent activity of the stabiliser mixture of components (b) and (c), or (b), (c) and (d), according to the invention as processing stabilisers (heat stabilisers). For that purpose they are advantageously added to the polymer before or during processing. However, other polymers (e.g. elastomers) or lubricants and hydraulic fluids can be stabilised against degradation, e.g. light-induced or thermooxidative degradation. Elastomers can be found in the above list of possible organic materials.

The lubricants and hydraulic fluids that come into consideration are based, for example, on mineral oils or synthetic oils or mixtures thereof. The lubricants will be familiar to the person skilled in the art and are described in the relevant specialist literature, such as, for example, in Dieter Klamann, "Schmierstoffe und verwandte Produkte" [Lubricants and related products] (Verlag Chemie, Weinheim, 1982), in Schewe-Kobek, "Das Schmiermittel-Taschenbuch" [The lubricant handbook] (Dr. Alfred H üthig-Verlag, Heidelberg, 1974) and in "Ullmanns Enzyklop ädie der technischen Chemie" [Ullmann's Encyclopaedia of Industrial Chemistry], Vol. 13, pages 85–94 (Verlag Chemie, Weinheim, 1977).

A preferred embodiment of the present invention is accordingly the use of components (b) and (c), or (b), (c) and (d), as stabilisers, especially processing stabilisers (thermostabilisers), for organic materials, especially thermoplastic polymers, against oxidative, thermal or light-induced degradation.

The present invention relates also to a method of stabilising an organic material against oxidative, thermal or light-induced degradation which comprises incorporating into or applying to that material at least one each of components (b) and (c), or of components (b), (c) and (d).

The present invention relates also to a stabiliser mixture comprising i) at least one compound of formula I

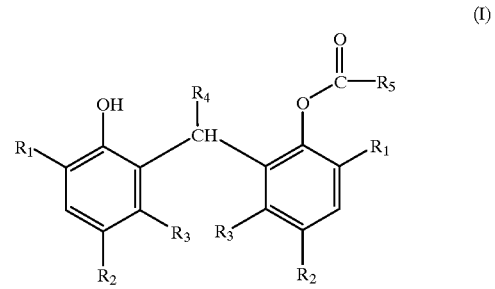

wherein
$R_1$ and $R_2$ are each independently of the other $C_1$–$C_{25}$alkyl; $C_5$–$C_{12}$cycloalkyl unsubstituted or substituted by $C_1$–$C_4$alkyl; $C_7$–$C_9$phenylalkyl; or phenyl unsubstituted or substituted by $C_1$–$C_4$alkyl,
$R_3$ is hydrogen or methyl,
$R_4$ is hydrogen or $C_1$–$C_8$alkyl,
$R_5$ is $C_1$–$C_{25}$alkyl; $C_2$–$C_{25}$alkyl interrupted by oxygen, sulfur or

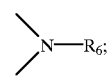

$C_2$–$C_{24}$alkenyl; $C_8$–$C_{30}$phenylalkenyl unsubstituted or substituted on the phenyl ring by halogen, $C_1$–$C_4$alkyl, $C_1$–$C_4$alkoxy or $C_1$–$C_4$alkylthio; $C_5$–$C_{12}$cycloalkyl unsubstituted or substituted by $C_1$–$C_4$alkyl; $C_8$–$C_{30}$phenylalkyl unsubstituted or substituted on the phenyl ring by halogen, $C_1$–$C_4$alkyl, $C_1$–$C_4$alkoxy or $C_1$–$C_4$alkylthio; or phenyl unsubstituted or substituted by halogen, $C_1$–$C_4$alkyl, $C_1$–$C_4$alkoxy or $C_1$–$C_4$alkylthio, and $R_6$ is hydrogen or $C_1$–$C_{18}$alkyl, and ii) calcium lactate and/or calcium stearoyl-2-lactylate.

Also of interest is a stabiliser mixture comprising in addition iii) at least one compound from the group of the phenolic antioxidants.

Preference is given to stabiliser mixtures in which the ratio by weight of component (i) to component (ii) is from 1:10 to 10:1, especially from 1:10 to 5:1, e.g. from 1:6 to 3:2.

Preference is given also to stabiliser mixtures in which the ratio by weight of components (i) to (ii) to (iii) is from 1:1:1 to 1:10:10, especially from 1:1:1 to 1:6:6.

The stabiliser mixture of components (i) and (ii), or (i), (ii) and (iii), according to the invention, is distinguished by an outstandingly good stability towards hydrolysis and an advantageous colour behaviour, that is to say, little discoloration of the organic materials during processing.

Organic materials that have been stabilised with the components of the present invention are also especially well protected against light-induced degradation.

The preferred components (b)/(i) and (c)/(ii), or (b)/(i), (c)/(ii) and (d)/(iii), for use as stabilisers, the method of stabilisation and the stabiliser mixture are the same as those described for the compositions comprising an organic material.

The following Examples illustrate the invention further. Parts or percentages relate to weight.

EXAMPLE 1

Preparation of Compound (105) (Table 1)

0.80 ml (10.5 mmol) of acetyl chloride is added dropwise, in the course of 10 minutes at 10° C., under a nitrogen atmosphere, to a solution of 4.39 g (10.0 mmol) of 2,2'-ethylidene-bis(4,6-di-tert-butylphenol) [prepared, for example, according to EP-A-0 500 323, Example 1] and 1.32 g (13.0 mmol) of triethylamine in 50 ml of toluene. When the addition is complete, the reaction mixture is stirred for 2 hours at room temperature. The precipitated triethylamine hydrochloride is filtered off and the filtrate is concentrated using a vacuum rotary evaporator. Crystallisation of the residue from ethanol yields 3.3 g (69%) of a white powder, m.p. 210 to 212° C. (compound (105), Table 1). Analysis: calculated: C 79.95, H 10.06%; found: C 79.88, H 10.18%.

Compounds (107), (113) and (115) (Table 1) are obtained analogously to Example 1 using butyric acid chloride, decanoic acid chloride and lauric acid chloride instead of acetyl chloride. Compound (107) has a melting point of 102 to 104° C. Analysis: calculated: C 80.26, H 10.30%; found: C 80.05, H 10.42%. Compound (113) has a melting point of 85 to 86° C. Analysis: calculated: C 81.03, H 10.88%; found: C 81.04, H 10.96%. Compound (115) has a melting point of 85 to 87° C. Analysis: calculated: C 81.23, H 11.04%; found: C 80.98, H 11.24%.

EXAMPLE 2

Preparation of Compound (119) (Table 1)

A solution of 5.86 g (35.2 mmol) of trans-cinnamic acid chloride in 30 ml of toluene is added dropwise, at room temperature, to a solution of 15.42 g (35.2 mmol) of 2,2'-ethylidene-bis-(4,6-di-tert-butylphenol) [prepared, for example, according to EP-A-0 500 323, Example 1] and 6.37 ml (45.7 mmol) of triethylamine in 100 ml of toluene. When the addition is complete, the resulting light-yellow suspension is stirred for 3 hours at room temperature. The precipitated triethylamine hydrochloride is filtered off and the filtrate is concentrated using a vacuum rotary evaporator. Crystallisation of the residue from isopropanol yields 18 g (90%) of a white powder, melting point 195 to 198° C. (compound (119), Table 1). Analysis: calculated: C 82.35, H 9.21%; found: C 82.38, H 9.29%.

Compound (117) (Table 1) is obtained analogously to Example 2 using crotonic acid chloride instead of trans-cinnamic acid chloride. Compound (117) has a melting point of 116–121° C. Analysis: calculated: C 80.58, H 9.95%; found: C 80.49, H 10.04%.

EXAMPLE 3

Stabilisation of Styrene/butadiene Block Copolymers

Oxidative, thermal or light-induced damage to styrene/butadiene block copolymers gives rise to crosslinking of the rubber phase. During processing in an extruder or in an injection moulding machine that crosslinking gives rise to an undesired increase in the melt viscosity and consequently an undesired extrusion pressure. The processing stability of styrene/butadiene block copolymers is tested in a capillary rheometer. In that test the polymer is forced through a nozzle in the form of a melt in a similar manner to during extrusion.

20 g of styrene/butadiene block copolymer granules (Styrolux®, BASF) are dissolved in 200 ml of cyclohexane and then precipitated with methanol. The precipitated polymer is filtered and dried under a high vacuum. That stabiliser-free polymer is dissolved again in 100 ml of cyclohexane and the stabilisers listed in Table 2, dissolved in toluene, are added thereto. The solution is subsequently concentrated using a vacuum rotary evaporator and the residue is dried at 60° C. under a high vacuum. The polymer so obtained is compressed at 180° C. to form 2 mm-thick plates from which circular samples having a diameter of 8 mm are punched. Those samples are inserted into the receiving channel of a capillary rheometer of the Keyeness Galaxy®V type. Measurements are taken for one half of the samples at 250° C., and for the other half at 260° C., at a shear rate of 14.594 $sec^{-1}$. After a running time of 6 minutes, the apparent shear rate is recorded for a period of 30 minutes as a function of the time. The gradient of the curve ($\Delta\eta/\Delta t$ in Pascal·seconds per minute) is a measure of the degree of crosslinking of the polymer and accordingly correlates directly with the effect of the stabilisers. The smaller that value, the more effective the stabilisers. The results are given in Table 2.

TABLE 2

| | | $\Delta\eta/\Delta t$ in Pascal • seconds per minute | |
|---|---|---|---|
| Examples | Stabiliser | at 250° C. | at 260° C. |
| Example 3a[a)] | — | 104 | >>104 |
| Example 3b[a)] | 0.05% Irganox ® 3052[c)] | 38 | 74 |
| Example 3c[a)] | 0.30% Pationic ® 930[d)] | 202 | >>202 |

TABLE 2-continued

| | | Δη/Δt in Pascal • seconds per minute | |
|---|---|---|---|
| Examples | Stabiliser | at 250° C. | at 260° C. |
| Example 3d[b] | 0.05% Irganox ® 3052[c] 0.30% Pationic ® 930[d] | 0.0 | 8.0 |
| Example 3e[b] | 0.05% Irganox ® 3052[c] 0.15% Pationic ® 930[d] 0.15% Irganox ® 1010[e] | 0.0 | 5.0 |

[a]Comparison Example.
[b]Examples according to the invention.
[c]Irganox ® 3052 (Ciba Spezialitätenchemie AG) denotes compound (101) (Table 1).

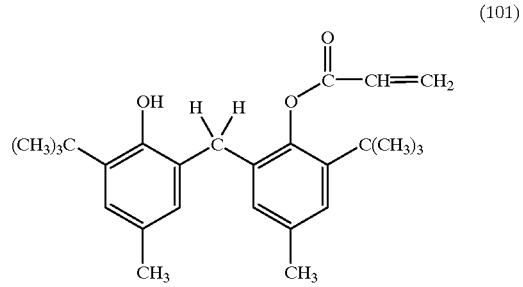

(101)

[d]Pationic ® 930 (American Ingredients Company, PATCO Polymer Additives Division, Kansas City, USA) denotes a calcium stearoyl-2-lactylate.
[e]Irganox ® 1010 (Ciba Spezialitätenchemie AG) denotes a compound of formula AO-2

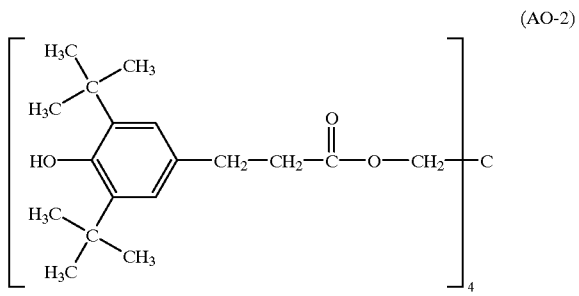

(AO-2)

What is claimed is:

1. A composition comprising
   a) an organic material subject to oxidative, thermal or light-induced degradation,
   b) at least one compound of formula I

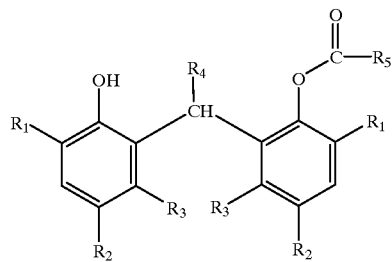

(I)

wherein
$R_1$ and $R_2$ are each independently of the other $C_1$–$C_{25}$alkyl; $C_5$–$C_{12}$cycloalkyl unsubstituted or substituted by $C_1$–$C_4$alkyl; $C_7$–$C_9$phenylalkyl; or phenyl unsubstituted or substituted by $C_1$–$C_4$alkyl,
$R_3$ is hydrogen or methyl,
$R_4$ is hydrogen or $C_1$–$C_8$alkyl,
$R_5$ is $C_1$–$C_{25}$alkyl; $C_2$–$C_{25}$alkyl interrupted by oxygen, sulfur or

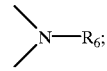

$C_2$–$C_{24}$alkenyl; $C_8$–$C_{30}$phenylalkenyl unsubstituted or substituted on the phenyl ring by halogen, $C_1$–$C_4$alkyl, $C_1$–$C_4$alkoxy or $C_1$–$C_4$alkylthio; $C_5$–$C_{12}$cycloalkyl unsubstituted or substituted by $C_1$–$C_4$alkyl; $C_8$–$C_{30}$phenylalkyl unsubstituted or substituted on the phenyl ring by halogen, $C_1$–$C_4$alkyl, $C_1$–$C_4$alkoxy or $C_1$–$C_4$alkylthio; or phenyl unsubstituted or substituted by halogen, $C_1$–$C_4$alkyl, $C_1$–$C_4$alkoxy or $C_1$–$C_4$alkylthio,
$R_6$ is hydrogen or $C_1$–$C_{18}$alkyl, and
c) calcium lactate and/or calcium stearoyl-2-lactylate.

2. A composition according to claim 1 comprising in addition d) at least one compound from the group of the phenolic antioxidants.

3. A composition according to claim 1 comprising as component (b) at least one compound of formula I wherein
$R_1$ and $R_2$ are each independently of the other $C_1$–$C_{18}$alkyl; $C_5$–$C_8$cycloalkyl unsubstituted or substituted by $C_1$–$C_4$alkyl; $C_7$–$C_9$phenylalkyl; or phenyl,
$R_3$ is hydrogen or methyl,
$R_4$ is hydrogen or $C_1$–$C_8$alkyl,
$R_5$ is $C_1$–$C_{18}$alkyl; $C_2$–$C_{18}$alkyl interrupted by oxygen, sulfur or >N—$R_6$; $C_2$–$C_{18}$alkenyl; $C_8$–$C_{18}$phenylalkenyl unsubstituted or substituted on the phenyl ring by halogen, $C_1$–$C_4$alkyl, $C_1$–$C_4$alkoxy or $C_1$–$C_4$alkylthio; $C_5$–$C_{12}$cycloalkyl; $C_8$–$C_{18}$phenylalkyl unsubstituted or substituted on the phenyl ring by halogen, $C_1$–$C_4$alkyl, $C_1$–$C_4$alkoxy or $C_1$–$C_4$alkylthio; or phenyl unsubstituted or substituted by chlorine, $C_1$–$C_4$alkyl or $C_1$–$C_4$alkoxy, and
$R_6$ is hydrogen or $C_1$–$C_{12}$alkyl.

4. A composition according to claim 1 comprising as component (b) at least one compound of formula I wherein
$R_1$ and $R_2$ are each independently of the other $C_1$–$C_{12}$alkyl, $C_5$–$C_8$cycloalkyl, $C_7$–$C_9$phenylalkyl or phenyl,
$R_3$ is hydrogen,
$R_4$ is hydrogen or $C_1$–$C_4$alkyl, and
$R_5$ is $C_1$–$C_{12}$alkyl; $C_2$–$C_{12}$alkyl interrupted by oxygen or sulfur; $C_2$–$C_{12}$alkenyl; $C_8$–$C_{10}$phenylalkenyl unsubstituted or substituted on the phenyl ring by $C_1$–$C_4$alkyl or $C_1$–$C_4$alkoxy; $C_5$–$C_8$cycloalkyl; $C_8$–$C_{18}$phenylalkyl unsubstituted or substituted on the phenyl ring by chlorine, $C_1$–$C_4$alkyl or $C_1$–$C_4$alkoxy; or phenyl unsubstituted or substituted by chlorine, $C_1$–$C_4$alkyl or $C_1$–$C_4$alkoxy.

5. A composition according to claim 1 comprising as component (b) at least one compound of formula I wherein
$R_1$ is $C_1$–$C_6$alkyl, cyclohexyl or phenyl,
$R_2$ is $C_1$–$C_6$alkyl, cyclohexyl or phenyl,
$R_3$ is hydrogen,
$R_4$ is hydrogen or methyl, and
$R_5$ is $C_1$–$C_{12}$alkyl; $C_2$–$C_{12}$alkyl interrupted by oxygen; $C_2$–$C_{10}$alkenyl; $C_8$–$C_{10}$phenylalkenyl unsubstituted or substituted on the phenyl ring by methoxy; cyclohexyl; or phenyl unsubstituted or substituted by chlorine or methoxy.

6. A composition according to claim 1 comprising as component (b) at least one compound of formula I wherein
$R_1$ is tert-butyl or tert-pentyl,
$R_2$ is $C_1$–$C_5$alkyl,
$R_3$ is hydrogen,
$R_4$ is hydrogen or methyl, and
$R_5$ is vinyl.

7. A composition according to claim 1, wherein component (c) is calcium stearoyl-2-lactylate.

8. A composition according to claim 2, wherein component (d) is a compound of formula AO-1, AO-2, AO-3, AO-4, AO-5, AO-6, AO-7, AO-8 or AO-9

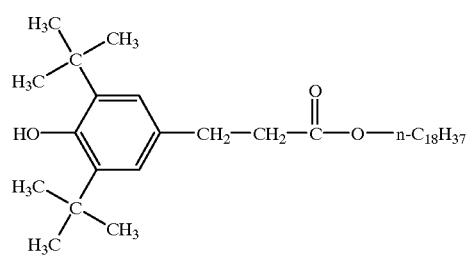

(AO-1)

(AO-2)

(AO-3)

(AO-4)

-continued

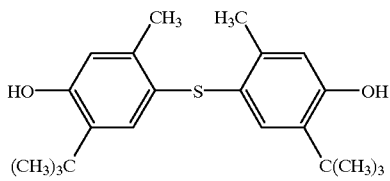

(AO-5)

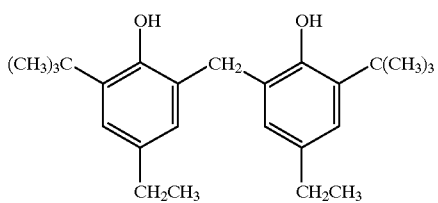

(AO-6)

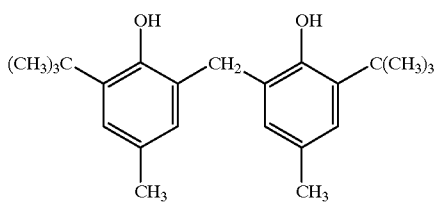

(AO-7)

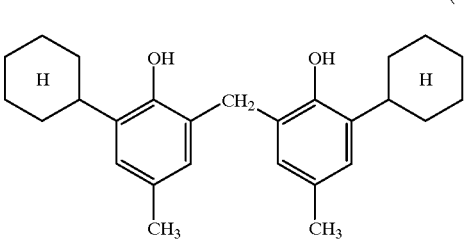

(AO-8)

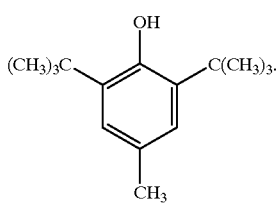

(AO-9)

9. A composition according to claim 1, wherein component (a) is a natural, semi-synthetic or synthetic polymer.

10. A composition according to claim 1, wherein component (a) is a thermoplastic polymer.

11. A composition according to claim 1, wherein component (a) is a copolymer of styrene or α-methylstyrene with a diene.

12. A composition according to claim 1, wherein component (a) is a styrenelbutadiene copolymer, a styrenelbutadiene block copolymer or polybutadiene.

13. A composition according to claim 1 comprising further additives in addition to components (a), (b) and (c).

14. A stabiliser mixture comprising i) at least one compound of formula I

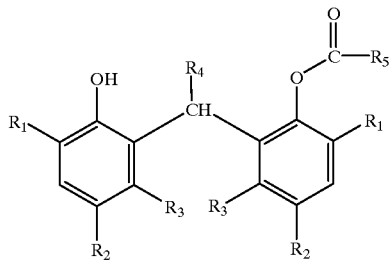

(I)

wherein $R_1$ and $R_2$ are each independently of the other $C_1$–$C_{25}$alkyl; $C_5$–$C_{12}$cycloalkyl unsubstituted or substituted by $C_1$–$C_4$alkyl; $C_7$–$C_9$phenylalkyl; or phenyl unsubstituted or substituted by $C_1$–$C_4$alkyl, $R_3$ is hydrogen or methyl, $R_4$ is hydrogen or $C_1$–$C_8$alkyl, $R_5$ is $C_1$–$C_{25}$alkyl; $C_2$–$C_{25}$alkyl interrupted by oxygen, sulfur or

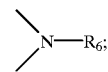

$C_2$–$C_{24}$alkenyl; $C_8$–$C_{30}$phenylalkenyl unsubstituted or substituted on the phenyl ring by halogen, $C_1$–$C_4$alkyl, $C_1$–$C_4$alkoxy or $C_1$–$C_4$alkylthio; $C_5$–$C_{12}$cycloalkyl unsubstituted or substituted by $C_1$–$C_4$alkyl; $C_8$–$C_{30}$phenylalkyl unsubstituted or substituted on the phenyl ring by halogen, $C_1$–$C_4$alkyl, $C_1$–$C_4$alkoxy or $C_1$–$C_4$alkylthio; or phenyl unsubstituted or substituted by halogen, $C_1$–$C_4$alkyl, $C_1$–$C_4$alkoxy or $C_1$–$C_4$alkylthio, and $R_6$ is hydrogen or $C_1$–$C_{18}$alkyl, and ii) calcium lactate and/or calcium stearoyl-2-lactylate.

15. A stabiliser mixture according to claim 14 comprising in addition iii) at least one compound from the group of the phenolic antioxidants.

16. A stabiliser mixture according to claim 14, wherein the ratio by weight of component (i) to component (ii) is from 1:10 to 10:1.

17. A stabiliser mixture according to claim 15, wherein the ratio by weight of components (i) to (ii) to (iii) is from 1:1:1 to 1:10:10.

18. A method of stabilising an organic material against oxidative, thermal or light-induced degradation which comprises incorporating into or applying to that material at least one each of components (b) and (c) according to claim 1.

* * * * *